United States Patent [19]

Pasch

[11] Patent Number: 5,959,776
[45] Date of Patent: Sep. 28, 1999

[54] METHOD AND APPARATUS OF FOURIER MANIPULATION IN AN OPTIC LENS OR MIRROR TRAIN

[75] Inventor: Nicholas F. Pasch, Pacifica, Calif.

[73] Assignee: LSI Logic Corporation, Milpitas, Calif.

[21] Appl. No.: 08/756,662

[22] Filed: Nov. 26, 1996

[51] Int. Cl.$^6$ .............................. G02B 27/46; G06K 9/40
[52] U.S. Cl. .................... 359/562; 359/559; 359/564; 382/265
[58] Field of Search .................. 359/559, 558, 359/562, 564; 382/210, 265

[56] References Cited

U.S. PATENT DOCUMENTS

| | | | |
|---|---|---|---|
| 3,700,902 | 10/1972 | Buchan | 250/201.1 |
| 3,729,252 | 4/1973 | Nelson | 359/562 |
| 4,370,024 | 1/1983 | Task et al. | 359/562 |
| 5,072,314 | 12/1991 | Chang | 359/559 |
| 5,119,443 | 6/1992 | Javidi et al. | 382/42 |
| 5,311,359 | 5/1994 | Lucas, et al. | 359/559 |
| 5,337,183 | 8/1994 | Rosenblatt | 359/248 |
| 5,426,521 | 6/1995 | Chen, et al. | 359/559 |
| 5,627,678 | 5/1997 | Nishii, et al. | 359/559 |
| 5,638,211 | 6/1997 | Shiraishi | 359/559 |
| 5,798,864 | 8/1998 | Sekiguchi | 359/559 |

FOREIGN PATENT DOCUMENTS

| | | | |
|---|---|---|---|
| 535564 | 4/1993 | European Pat. Off. | 359/559 |
| 2-222921 | 9/1990 | Japan | 359/559 |

*Primary Examiner*—Cassandra Spyrou
*Assistant Examiner*—John Juba, Jr.
*Attorney, Agent, or Firm*—Conley, Rose & Tayon; Jeffrey C. Hood; Dan J. Krueger

[57] ABSTRACT

An optical system is provided with an adaptable window element at a Fourier plane for spatial filtering. Having a window element made up of individually addressable pixels provides a substantial improvement in the spatial filtering adaptability and precision. When combined with a computer and sensor, the window may become part of a negative feedback loop, thereby providing the optical system with more consistent reproducibility, higher reliability with graceful degradation, and more precise control over final results.

22 Claims, 1 Drawing Sheet

METHOD AND APPARATUS OF FOURIER MANIPULATION IN AN OPTIC LENS OR MIRROR TRAIN

RELEVANT PATENTS

U.S. Pat. No. 3,700,902 10/1972 Buchan
U.S. Pat. No. 3,729,252 4/1973 Nelson
U.S. Pat. No. 4,370,024 1/1983 Task et al.
U.S. Pat. No. 5,072,314 12/1991 Chang
U.S. Pat. No. 5,337,183 8/1994 Rosenblatt

BACKGROUND OF THE INVENTION

1. Field of the Invention

This invention relates to the field of optical spatial filtering. More particularly, this invention concerns a system in which the spatial filtering characteristics are dynamically controllable with a high degree of versatility and precision.

2. Description of the Relevant Art

Systems which project an optical image on a surface have a wide variety of applications. These applications include microscopy and photolithography. In these areas, a high degree of resolution and dynamic adaptability are essential. One method for increasing image resolution is known as spatial filtering.

A variety of changes can be made in the clarity, resolution, and appearance of the details in an optical image by modifying (filtering) the amplitude or phase of the light in a variety of regions of the specimen's spatial Fourier transform. The spatial Fourier transform is produced most accurately if the light source has a small size in terms of its subtended angle. Maximum spatial-frequency discrimination is obtained in spatial filtering if the light is highly coherent both spatially and temporally. Light from a point source is highly coherent spatially, and monochromatic light is highly coherent temporally. Both types are useful in spatial filtering. Furthermore, both types are easily obtained through use of a laser beam focused by a lens through a pinhole.

The characteristics of the Fourier spectrum are predictable from the spatial distribution of amplitude transmittance and phase in the image bearing medium. The amplitude transmittance characteristics of the image-bearing medium can be resolved by Fourier analysis into its sine wave and cosine wave components, each of which has a certain spatial frequency, amplitude, azimuth orientation, and phase. Each point in the spectrum represents, for any given wavelength of light, a particular spatial frequency in the transparency. The intensity at each point in the spectrum is proportional to the square of the amplitude of the corresponding spatial frequency component of the transparency. The high frequency and edge sharpness information is represented, in the Fourier transform plane, by points of light that lie at a greater distance from the optic axis than the points of light representing the low frequency information and large area contrast of the transparency.

For the purpose of increasing the edge sharpness and fine-detail contrast of the projected image of a photographic transparency, a certain type of spatial filter can be inserted into the Fourier transform plane. Such a filter can comprise a clear, optically flat, glass plate bearing a light-absorbing medium that in some pre-selected pattern (pattern of dots, variable density areas, etc.) transmits a fraction (such as one-fourth in terms of intensity or one-half in terms of amplitude) of the light in the zero-frequency and low-frequency regions but transmits progressively more freely in the medium and high-frequency regions.

Spatial filtering can be done with either coherent or partially coherent light, but the spatial frequency discrimination is greatest when the light is highly coherent. If in the particular application of interest, high discrimination is not required, the degree of coherence can be substantially reduced as a means of increasing the light intensity. The effective source is the illuminated pinhole, and if the size of the pinhole is increased and/or the wavelength bandwidth of the light is increased, the spatial frequency discrimination can be reduced to its minimum required value. With partially coherent light, the spatial filtering is always gradual with respect to spatial frequency. Abrupt changes with respect to spatial frequency are possible only with highly coherent light, but the gradual type is satisfactory in many practical applications. A decrease in coherence is, with most sources, accompanied by a large increase in intensity, which can be an important practical advantage.

One advantage of optical spatial filtering is that the resolution of the spatial filter is not critical. In fact, beam manipulation at the Fourier plane may take place at a much larger scale than that of the image source.

Spatial filtering is typically implemented using a trial-and-error approach. A projected image is studied, flaws determined, and various corrective approaches are attempted. The corrective approaches often consist of attempting various combinations of standard patterns for spatial filtering until the desired result is achieved. This approach is practical only because a limited number of identified flaws and filtering solutions are dealt with.

It is then desirable to provide a dynamically adjustable system which can not only implement the pattern combinations described above, but also provide a method of fine-tuning the combinations for specific source images and image plane characteristics. An additionally desirable characteristic of such a system would be the ability to search for novel filtering solutions to identified flaws.

SUMMARY OF THE INVENTION

The present invention contemplates an optical system for projecting and dynamically modifying an image. The system preferably includes a source of coherent light, a window element, an image element, and a final image plane. A coherent light beam undergoes a spatial Fourier transform, passes through the window element according to the present invention, undergoes a second spatial Fourier transform, passes through the image element, and projects upon the final image plane.

The present invention comprises an optical system which incorporates a window element at a Fourier plane for spatial filtering. The window element comprises a plurality of pixels which are each individually addressable and configurable as to their state of transmissivity of reflectivity. The window is positioned to alter the Fourier spectrum of the final image provided by the optical system. The use of pixels according to present invention provides a substantial improvement in the spatial filtering adaptability and precision. When combined with a computer and sensor, the window may become part of a negative feedback loop, thereby providing the optical system with more consistent reproducibility, higher reliability with graceful degradation, and more precise control over final results.

BRIEF DESCRIPTION OF THE DRAWINGS

Other objects and advantages of the invention will become apparent upon reading the following detailed description and upon reference to the accompanying drawings in which.

Figure 1:
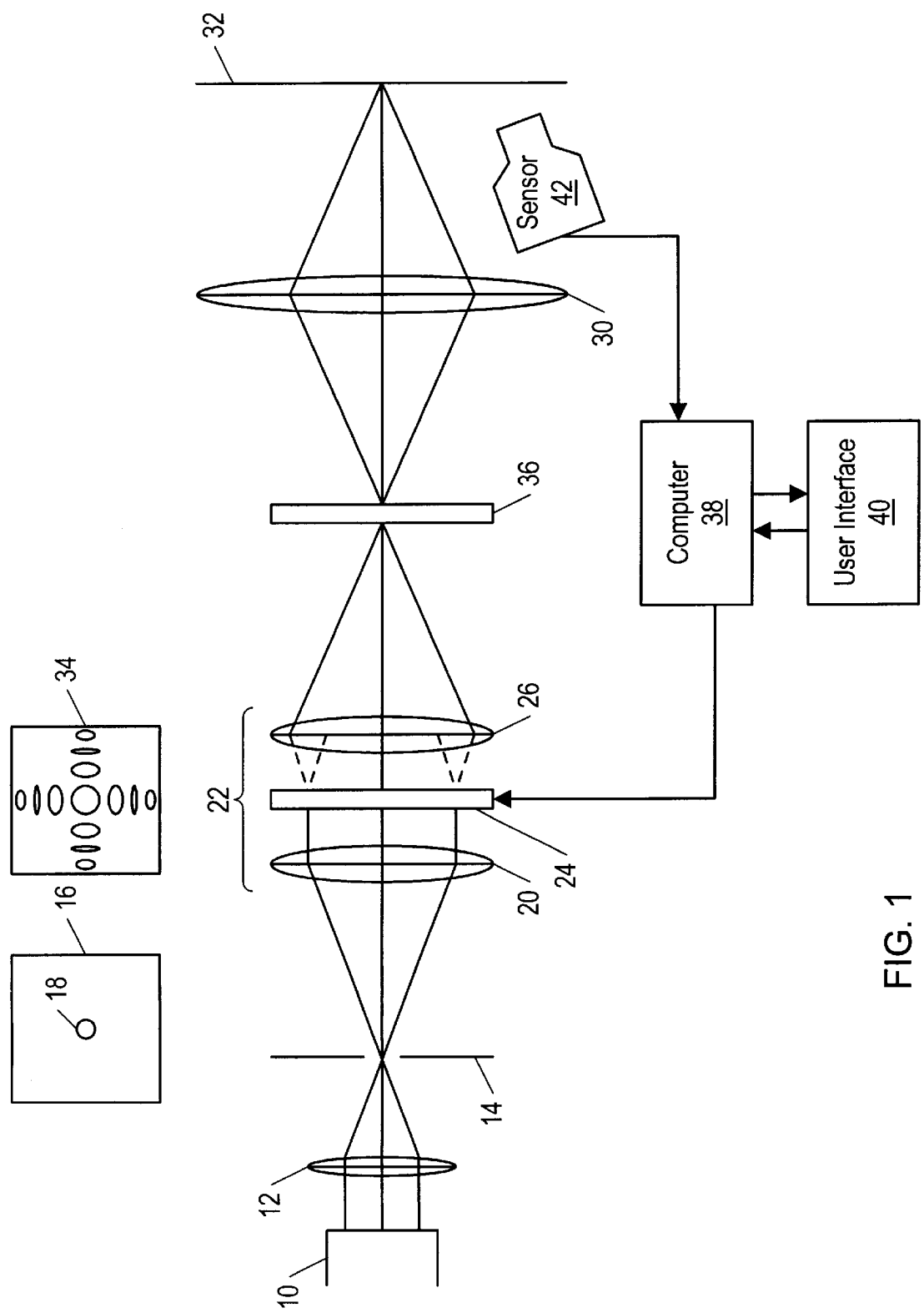
FIG. 1 is a schematic optical system showing a dynamically adjustable spatial filtering system in which a laser and a pinhole are used to produce a single effective lighting source.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 illustrates an optical system that utilizes spatial filtering according to the preferred embodiment of the invention. The optical system includes a light source 10 in optical communication with a lens 12, a plate 16 having an aperture 18, an illumination collimator system 22 with a spatial filter 24 according to the present invention, a photo plate 36, an objective lens system 30, and a final image plane 32. As discussed below, the spatial filter 24 comprises a plurality of individually addressable pixels and provides a substantial improvement in spatial filtering adaptability and precision. In the preferred embodiment, the light source 10 comprises a laser as the source of coherent electromagnetic radiation. It is noted that other types of light sources, such as an arc lamp or a super-fluorescent fiber source (SFS) may be used. Laser 10 produces coherent rays of light which are focused by lens 12 to a point in plane 14. Plate 16 having a very small aperture 18 is positioned in plane 14. Aperture 18 of plate 16 permits only a portion of the incident light to emanate therefrom. The light which passes through aperture 18 is received by illumination collimator lens system 22. The light emanating from aperture 18 is hereafter considered to be effectively emanating from a point source.

The illumination collimator lens system 22 comprises a lens 20 and a lens 26. Lens 20 is configured to perform a spatial Fourier transform, and in so doing, make the light rays substantially parallel in a region between lens 20 and lens 26. Spatial filter 24 is positioned in the described region to modify the contrast and sharpness characteristics of the projected image in image-receiving plane 32. Lens 26 is configured to perform a second spatial Fourier transform, causing the light rays to converge to a point at photo plate 36.

Photo plate 36 is preferentially a slide of transparent quartz coated with chrome. However, photo plate 36 may be any form of transparency (black and white, color, negative or positive) bearing an image. The light output from illumination collimator lens system 22 is provided through photo plate 36 to objective lens system 30. Lens system 30 forms a real image of photo plate 36 on an image-receiving plane 32. Image-receiving plane 32 can be a screen or a photosensitive material, such as photographic film or a photoresist-coated wafer.

Spatial filter 24 selectively passes spatial components of the light beam. Preferentially passing axially symmetric components of the light beam is a useful way to modify the effective shape, size, and distribution of light intensity in the light source. The modified light source is then cast on photo plate 36. The modification of the light source can be done to enhance the resolution of lines imaged on plane 32. At the same time, modifications may be made to alter the brightness and overall contrast of larger areas in the image. This is done in the following manner.

Illumination collimator 22 performs a spatial Fourier transform of the point source in plane 14. In the region between lens 20 and lens 26, the intensity of a portion of the light beam represents the amplitude of a spatial spectrum component. The low frequency spatial components lie near the center and close to the optic axis. The middle frequency spatial components lie at a greater distance from the center and the high frequency spatial components at the greatest distance from the center. The distance from the optic axis is proportional to the spatial frequency and to the wavelength of the light. An exemplary desired pattern of these frequencies is shown schematically in the form of a plate 34. A desired pattern is chosen based on desired alterations to the image projected on plane 32. Enhancement of the edge sharpness may be accomplished by preferentially passing high frequency spatial components relative to low frequency spatial components.

Although the pattern shown is one for a rectilinear image, no such restriction is implied. Indeed, the versatility of this system makes it ideal for usage with novel image patterns, including hexagonal patterns. A class of such hexagonal patterns is exemplified in U.S. patent application Ser. No. 08/517,142 filed Aug. 21, 1995, by Michael D. Rostoker et al., and entitled "Hexagonal Architecture", which is hereby incorporated by reference as though fully and completely set forth herein. This patent describes a microelectronic integrated circuit structure using hexagonal shaped cells. Also described are triangular and parallelogram shaped devices which may form clusters which comprise the cells. Further described are tridiagonal routing methods which provide conduction paths in three directions which are angularly displaced from each other by 60 degrees. Enhancing the sharpness of edges in a hexagonal structure will typically require a spatial filtering pattern which is significantly different than a spatial filter for enhancing edge sharpness in a rectilinear pattern.

According to the preferred embodiment of the invention, spatial filter 24 is a window (i.e. a pane of transparent or reflective material) comprised of a multitude of pixels, each individually addressable and configurable. The pixels may be selectively placed in one of a plurality of states of varying transmissivity. Implementations of the actions of the window may make use of LCD (liquid crystal display) or magneto-optic technology. The window may also incorporate a technology using physical manipulation of the optical path lengths of stacks of dielectric materials, such as that disclosed in U.S. Pat. No. 5,337,183 on Aug. 9, 1994 by Rosenblatt, which is hereby incorporated by reference and completely set forth herein. Other technologies could also be used.

A computer 38 or other control device is used to exert control over the states of the pixels comprising spatial filter 24. In the preferred embodiment, computer 38 is a general purpose computer which may be programmed by a user interface 40. Programmability allows extremely versatile control of spatial filter 24, including a time-varying spatial filtering characteristic should that be desirable. Computer 38 is also preferably coupled to a sensor 42 which is configured to measure characteristics of the final image in image plane 32. Sensor 42 measures characteristics of the final image in image plane 32 and provide corresponding signals to computer 38. Sensor 42 may take the form of a television camera providing an image to computer 38 or a stripline sensor which provides brightness information as a function of angle. Computer 38 receives the signals from sensor 42 and provides control signals to spatial filter 24 to control transmissivity of one or more pixels comprising spatial filter 24. This provides a mechanism for feedback control of spatial filter 24.

Feedback control permits very precise spatial filtering adjustments. In this configuration, computer 38 is capable of quickly optimizing a function of desirable spatial filtering characteristics which may include brightness, contrast, sharpness, fringing and preferential orientation. Furthermore, the function may quickly be adjusted for differing images and final image mediums. For example, certain photoresist coatings may require a higher contrast, or certain images might require preferential enhancement for lines in a given orientation. As a whole, the optical system of the present invention provides more consistent reproducibility, a higher reliability with graceful degradation, and more precise control over final results.

In addition to the discussed embodiment, it should be recognized that spatial filter 24 may be implemented as a window of pixels which may have varying reflectivity. The spatial filtering would then take place by selectively reflecting the desired frequency components rather than selectively transmitting the desired frequency components.

Numerous other variations and modifications will become apparent to those skilled in the art once the above disclosure is fully appreciated. It is intended that the following claims be interpreted to embrace all such variations and modifications.

What is claimed is:

1. An optical apparatus for dynamically modifying an image, comprising:
    a first optical element for receiving a beam of light and providing at a Fourier plane a spatial Fourier transform of information content in the beam;
    a window comprised of individually addressable pixels each possessing an optical property which may be dynamically set to one of two states, said window configured to impress an alteration of said Fourier transform on said beam;
    a second optical element for receiving the altered Fourier transform and providing at an image plane a second spatial Fourier transform of information content in the beam;
    an image source located substantially at the image plane and configured to impress an image on said beam, wherein said beam subsequently forms a final image on an image-receiving plane;
    a sensor configured to measure characteristics of the final image; and
    a computer coupled to the sensor to receive signals indicative of the measured characteristics and configured to responsively provide control signals to the window to dynamically adjust a light source's effective shape, size, and distribution of light intensity and thereby optimize a function of desirable characteristics, wherein the image-receiving plane comprises a final image medium, and wherein the computer is configured to adjust the function of desirable characteristics for different final image media.

2. The optical apparatus of claim 1, wherein the desirable characteristics include at least one characteristic from a set of image characteristics which comprises: brightness, contrast, sharpness, fringing, and orientation.

3. The optical apparatus of claim 1, wherein the computer is configurable to adjust the function of desirable characteristics for different images impressed on the beam by the image source.

4. The optical apparatus of claim 1, wherein the function of desirable characteristics is time-varying.

5. The optical apparatus of claim 1, wherein the computer is configurable to search for novel filtering solutions to identified flaws in the final image.

6. The optical apparatus of claim 1, wherein the sensor is a television camera.

7. The optical apparatus of claim 1, wherein the sensor is a stripline sensor.

8. The optical apparatus of claim 1, further comprising a third optical element optically coupled to the image source and configured to focus the final image on the image receiving plane.

9. The optical apparatus of claim 8, wherein the first, second, and third optical elements each comprise a lens.

10. The optical apparatus of claim 9, wherein said optical property is transmissivity.

11. A method for dynamically modifying an image, wherein the method comprises:
    passing a beam of light via a first optical element configured to provide at a Fourier plane a transform beam carrying a spatial Fourier transform of information content in the beam;
    altering the transform beam by use of a window comprised of individually addressable pixels each possessing an optical property which may be dynamically set to one of two states;
    passing the altered transform beam via a second optical element configured to provide at an image plane an improved beam carrying a second spatial Fourier transform of information content in the beam;
    impressing an image on said improved beam to produce an image beam;
    projecting the image beam on an image-receiving surface to form a final image;
    measuring image characteristics of the final image, wherein the measured characteristics include at least one characteristic from a set of image, characteristics which comprises: brightness, contrast, sharpness, fringing, and orientation;
    adjusting a function of the measured characteristics to account for an image-receiving plane media type; and
    dynamically adjusting the pixels in response to the measured characteristics to optimize the function of the measured characteristics.

12. The method of claim 11, wherein the measured characteristics include: brightness, contrast, sharpness, fringing, and orientation.

13. The method of claim 11, further comprising: impressing a different image on said improved beam; and adjusting the function of the measured characteristics for the different image.

14. The method of claim 11, further comprising: varying the function of the measured characteristics as a function of time.

15. The method of claim 11, wherein said optical property is transmissivity.

16. An optical apparatus for dynamically modifying an image, comprising: a first optical element for receiving a beam of light and providing at a Fourier plane a spatial Fourier transform of information content in the beam;
    a window comprised of individually addressable pixels each possessing an optical property which may be dynamically set to one of two states, said window configured to impress an alteration of said Fourier transform on said beam;

a second optical element for receiving the altered Fourier transform and providing at an image plane a second spatial Fourier transform of information content in the beam;

an image source located substantially at the image plane and configured to impress an image on said beam, wherein said beam subsequently forms a final image on an image-receiving plane;

a stripline sensor configured to measure characteristics of the final image; and a computer coupled to the sensor to receive signals indicative of the measured characteristics and configured to responsively provide control signals to the window to dynamically adjust a light source's effective shape, size, and distribution of light intensity and thereby optimize a function of desirable characteristics.

17. The optical apparatus of claim 16, wherein the desirable characteristics include at least one characteristic from a set of image characteristics which comprises: brightness, contrast, sharpness, fringing, and orientation.

18. The optical apparatus of claim 16, wherein the computer is configurable to adjust the function of desirable characteristics for different images impressed on the beam by the image source.

19. The optical apparatus of claim 16, wherein the function of desirable characteristics is time-varying.

20. The optical apparatus of claim 16, wherein the computer is configurable to search for novel filtering solutions to identified flaws in the final image.

21. The optical apparatus of claim 16, fuither comprising a third optical element optically coupled to the image source and configured to focus the final image on the image receiving plane.

22. The optical apparatus of claim 21, wherein the first, second, and third optical elements each comprise a lens.

* * * * *